United States Patent
Hong et al.

(10) Patent No.: US 9,891,771 B2
(45) Date of Patent: Feb. 13, 2018

(54) PROVIDING HOVER TOUCH ON A TOUCH PANEL AND METHOD FOR DRIVING THE TOUCH PANEL

(71) Applicant: Samsung Display Co., Ltd., Yongin-si (KR)

(72) Inventors: Won-Ki Hong, Suwon-si (KR); Jong Seo Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 52 days.

(21) Appl. No.: 14/849,169

(22) Filed: Sep. 9, 2015

(65) Prior Publication Data

US 2016/0306458 A1  Oct. 20, 2016

(30) Foreign Application Priority Data

Apr. 15, 2015 (KR) .................. 10-2015-0053338

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 2203/04108* (2013.01)

(58) Field of Classification Search
CPC . G06F 2203/04101; G06F 2203/04108; G06F 3/0416

See application file for complete search history.

(56) References Cited

U.S. PATENT DOCUMENTS

| | | | |
|---|---|---|---|
| 7,859,521 B2 | 12/2010 | Hotelling et al. | |
| 8,614,693 B2 | 12/2013 | King et al. | |
| 8,730,208 B2 | 5/2014 | Shin et al. | |
| 2012/0050210 A1* | 3/2012 | King | G06F 3/0416 345/174 |
| 2013/0278560 A1* | 10/2013 | Yamaguchi | G06F 3/044 345/174 |
| 2013/0300681 A1 | 11/2013 | Jamshidi-Roudbari et al. | |

(Continued)

FOREIGN PATENT DOCUMENTS

| | | |
|---|---|---|
| KR | 101318756 | 8/2010 |
| KR | 1020130041900 | 4/2013 |
| KR | 1020140105846 | 9/2014 |

OTHER PUBLICATIONS

Anton D. Nagy, "Samsung Galaxy S 5 will feature improved hovering thanks to new touch solution", Pocketnow, Jan. 16, 2014, http://pocketnow.com/2014/01/16/improved-hovering.

(Continued)

*Primary Examiner* — Sepehr Azari
(74) *Attorney, Agent, or Firm* — H.C. Park & Associates, PLC

(57) ABSTRACT

A touch panel includes touch electrodes and a touch driver configured to apply a driving signal to the touch electrodes to form sensing capacitors comprising the touch electrodes, the touch driver configured to sense a change in an amount of charge caused by the sensing capacitors. The touch driver is configured to distinguish hovering and floating based upon a result of sensing the time change in an amount of charge. The touch driver is configured to apply a highest level of the driving signal to a hovering electrode corresponding to a hovering position from among the touch electrodes.

16 Claims, 7 Drawing Sheets

(56) References Cited

U.S. PATENT DOCUMENTS

2014/0184543 A1   7/2014  Kim et al.
2015/0231491 A1*  8/2015  Hwang ............... A63F 13/2145
                                                345/161
2015/0277648 A1* 10/2015  Small .................... G06F 3/0416
                                                345/174

OTHER PUBLICATIONS

Sony Mobile Communications Inc., "Floating touchTM—Developer World", http://developer.sonymobile.com/knowledge-base/technologies/floating-touch/, last accessed on Jun. 11, 2015.

* cited by examiner

PROVIDING HOVER TOUCH ON A TOUCH PANEL AND METHOD FOR DRIVING THE TOUCH PANEL

CROSS-REFERENCE TO RELATED APPLICATION

This application claims priority from and the benefit of Korean Patent Application No. 10-2015-0053338, filed on Apr. 15, 2015, which is hereby incorporated by reference for all purposes as if fully set forth herein.

BACKGROUND

Field

Exemplary embodiments relate to a touch panel and a method for driving a touch panel.

Discussion of the Background

In general, display devices (i.e., a liquid crystal display and an organic light emitting display), portable transmission devices, and other information processing devices perform a function by using various input devices. Recently, input devices are more frequently including a touch sensing device.

A touch sensing function is used to determine contact information (i.e., whether an object approaches or touches a screen) and a touch location by sensing changes (i.e., changes in pressure, charge, and light) that are applied to the screen of the display device when a user writes text or draws figures on or near the screen using the object (i.e., a finger or a touch pen). The display device receives an image signal based on the contact information to display an image.

Such a touch sensing function may be realized through a touch electrode. The touch electrode may be classified into various types such as a resistive type, a capacitive type, an electromagnetic resonance (EMR) type, and an optical type.

In the case of the resistive touch electrode, two electrodes that face each other and are separated from each other may contact each other as a result of pressure from a finger. When the two electrodes contact each other, a contact position is known by recognizing changes of voltage induced by changes of resistance at the position.

The capacitive touch electrode includes a sensing capacitor formed of a plurality of touch electrodes for transmitting sensing signals. The capacitive touch electrode senses a change in capacitance of the sensing capacitor generated when a conductor such as a finger approaches the sensor to determine existence of a touch and a touch position.

The touch sensor may be formed on the touch panel and attached to the display device (add-on cell type). The touch sensor may be formed out of a substrate of the display device (on-cell type). The touch sensor may also be formed in the display device (in-cell type). The display device including the touch sensor may detect whether an object (i.e., a finger or a touch pen) touches the screen and the touch location information of the object. As a result, the display device may display an image corresponding to the touch.

The above-noted various types of touch electrodes are disposed in a touch region, include a plurality of touch electrodes for sensing touches, and include a connection wire connected to the touch electrodes. The touch region may overlap a display area. The connection wire may transmit a sensing input signal to the touch electrode or a sensing output signal of the touch electrode generated according to the touch to a sensing signal controller.

Conventionally, the touch driving signal for sensing a touch was applied in a uniform manner, wasting power consumption. Further, the touch driving signal was applied uniformly regardless of a user was using the touch panel or would be imminently using the touch panel, wasting further power consumption.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a touch panel and a method of driving a touch panel for changing a touch driving signal according to a hovering position and reducing power consumption.

Exemplary embodiments further provide a touch panel and a method of changing a touch driving signal for respective users and reducing power consumption.

Additional aspects will be set forth in the detailed description which follows, and, in part, will be apparent from the disclosure, or may be learned by practice of the inventive concept.

An exemplary embodiment discloses a touch panel including touch electrodes and a touch driver configured to apply a driving signal to the touch electrodes to form sensing capacitors comprising the touch electrodes, the touch driver configured to sense a change in an amount of charge caused by the sensing capacitors. The touch driver is configured to distinguish hovering and floating based upon a result of sensing the time change in an amount of charge. The touch driver is configured to apply a highest level of the driving signal to a hovering electrode corresponding to a hovering position from among the touch electrodes.

An exemplary embodiment also disclose a method for driving a touch panel comprising a touch driver configured to perform the method steps including distinguishing hovering of an object as the object approaches a touch electrode of touch electrodes of the touch panel and touches the touch electrode from floating of the object as the object approaches the touch electrode but does not touch the touch electrode and applying a highest level of a driving signal to at least one of a hovering electrode that is the touch electrode corresponding to a hovering position of the object and a touch electrode corresponding to an object touching the touch electrode greater than a reference number of touching times 'n'.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE EMBODIMENTS

Figure 1:
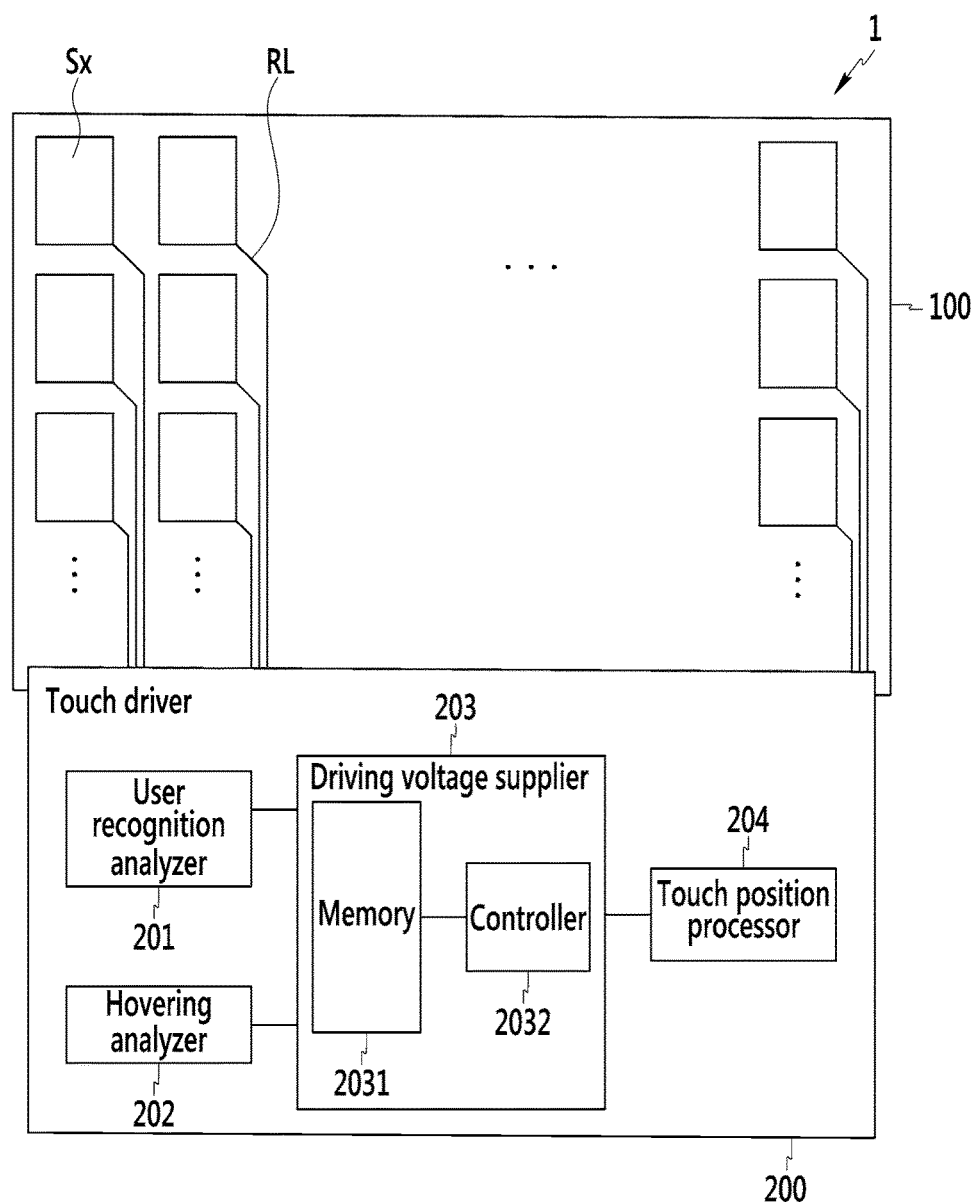
FIG. 1 illustrates a touch panel according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 illustrates a touch panel 1 according to an exemplary embodiment. The touch panel 1 includes a plurality of touch electrodes Sx (in some instances touch electrodes Sx are also referred to as hovering electrodes), a plurality of connection wires RL, and a touch driver 200.

The touch electrodes Sx may be arranged in a matrix form. The touch electrodes Sx may be formed on the same layer when viewed in a cross-sectional structure. The touch electrodes Sx may be made of a transparent conductive material, such as an indium tin oxide (ITO), an indium zinc oxide (IZO), a metal nanowire, a conductive polymer, or a thin metal layer. The touch electrodes Sx may include a metal, such as silver (Ag) or copper (Cu). However, the touch electrodes Sx are not limited to transparent conductive materials or the metals described above, and may include any suitable material.

The touch electrodes Sx may be quadrangular (i.e., square shaped or a rectangular shaped), as shown in FIG. 1. However, the touch electrodes Sx may be various shapes, and are not limited to a quadrangular shape. A side of the touch electrode Sx may be several millimeters long. For example, a side of the touch electrode Sx may be less than or substantially equal to 10 mm in length. More specifically, a side of the touch electrode Sx may be substantially 4 mm to 5 mm long. However, the size of the touch electrode Sx may be appropriately controlled according to a desired touch sensing resolution.

The touch electrodes Sx are separated from each other in the touch region. Different touch electrodes Sx may be connected to the touch driver 200 through different connection wires RL. The touch electrodes Sx receive a touch driving signal from the touch driver 200 through the connection wire RL.

The touch electrodes Sx may form a self-sensing capacitor and may be charged with a predetermined amount of charge corresponding to the touch driving signal. When an object (i.e., a finger or a touch pen) floats over the touch electrode Sx, hovers over the touch electrode Sx, or touches the touch electrode Sx, the amount of stored charge of the self-sensing capacitor changes. As a result, the touch electrode Sx may generate a sensing output signal. Here, the floating represents a motion where the object approaches the touch electrode Sx but never touches the touch electrode Sx during or after the approach of the object. The hovering represents a motion where the object approaches the touch electrode Sx and eventually touches the touch electrode Sx. To clarify, when hovering the object may move parallel to the touch electrode but eventually moves closer to the touch electrode Sx and touches the touch electrode Sx. However, when floating the object moves parallel to the touch electrode Sx and may move closer to the touch electrode Sx without actually touching it. A method for distinguishing the floating and the hovering will be described later.

The connection wire RL connects the touch electrode Sx and the touch driver 200 to transmit the touch driving signal or the sensing output signal. The connection wire RL may be provided on the same layer as the touch electrode Sx. The connection wire RL may be formed of the same material as the touch electrode Sx. However, in an alternate exemplary embodiment, the connection wire RL may be provided on a different layer from the touch electrode Sx. In the alternate exemplary embodiment, the connection wire RL may be connected to the touch electrode Sx through another connector.

The touch driver 200 is connected to the touch electrode Sx of the touch panel 100 to transmit a touch driving signal to the touch electrode Sx and receive a sensing output signal. The touch driver 200 may distinguish floating, hovering, a single touch, or multiple touches based on the sensing output signal. The touch driver 200 may generate touch information including a floating state, a hovering state, or a touching state with a corresponding floating position, hovering position, and touch position.

The touch driver 200 may recognize a user according to the touch electrode Sx and a finger touching area. The touch driver 200 may generate a driving signal (or a custom driving signal) for each recognized user.

The touch driver 200 includes a user recognition analyzer 201, a hovering analyzer 202, a driving signal supplier 203, and a touch position processor 204.

The user recognition analyzer 201 measures an amount of stored charge and a discharging time of the amount of stored charge according to the object features (i.e., a user's finger features such as finger size, callus, dielectricity, hair, etc.). The user recognition analyzer 201 recognizes the user (or the object) based on the measured amount of stored charge and the discharging time. The user recognition analyzer 201 counts the number of times the object touches (i.e., is registered by) the touch panel 100. The user recognition analyzer 201 generates user information including recognized user information and the number of times the user (or the object) touches the touch panel 100.

The hovering analyzer 202 measures a time change in an amount of charge of the self-sensing capacitor to determine a hovering state or a floating state. The hovering analyzer 202 determines an object is hovering when the time change in an amount of charge of at least one touch electrode Sx is greater than a predetermined hovering reference time. The hovering analyzer 202 determines an object is floating when the time change in an amount of charge of at least one touch electrode Sx is less than the predetermined hovering reference time. The hovering analyzer 202 generates hovering information including a hovering state or floating state and a corresponding hovering position or floating position.

The driving signal supplier 203 includes a memory 2031 and a controller 2032. The driving signal supplier 203 generates a touch driving signal according to the control of the controller 2032.

The driving signal supplier 203 applies a reference driving signal (Vr, 10 volts) to the touch electrode Sx. The driving signal supplier 203 applies the reference driving signal (Vr, 10 volts) in the case of floating according to hovering information. The driving signal supplier 203 applies an offset reference driving signal (Vr, 7.5 volts) to the touch electrode Sx in the case of hovering.

The memory 2031 stores user information, hovering information, and position information.

The controller 2032 measures a change in the amount of stored charge of the self-sensing capacitor. The controller 2032 determines a single touch of an object when the amount of stored charge of the self-sensing capacitor is greater than a reference change amount. The controller 2032 determines multiple touches of an object when the amount of stored charge of the self-sensing capacitors corresponding to touch electrodes Sx separated from each other is greater than the reference change amount.

The controller 2032 controls the generation of a user driving signal Vp or a reference driving signal Vr depending on the number of times the touch panel 100 is touched. The controller 2032 controls the generation of the reference driving signal Vr when the touch panel 100 is touched less than a reference number (n; e.g., n=1,000) by an object or multiple objects. The controller 2032 controls the generation of the user driving signal Vp when the touch panel 100 is touched more than the reference number (n; e.g., n=1,000) by an object or multiple objects. The user driving signal Vp may be a signal with a lower level than the reference driving signal Vr or a signal with a higher level than the reference driving signal Vr according to the object's size (i.e., finger size).

The controller 2032 may control the generation of different custom driving signals for respective users based upon user information.

The controller 2032 controls the application of the reference driving signal Vr to a plurality of touch electrodes Sx in the case of floating. The controller 2032 compares a position of the touch electrode (i.e., a hovering electrode) corresponding to a hovering position and a position of the actually touched electrode in the case of hovering.

When the position of the hovering electrode corresponds to the position of the actually touched electrode, the controller 2032 controls the application of the user driving signal $V_P$ to the hovering electrode. The controller 2032 also controls the distribution of a driving signal so that a level of the hovering electrode may become an apex.

When the position of the hovering electrode does not correspond to the position of the actually touched electrode, the controller 2032 controls the application of the user driving signal Vp to the actually touched touch electrode (hereinafter, "a user electrode"). The controller 2032 also controls the distribution of a driving signal so that the driving signal level of the user electrode may become an apex.

The distribution of a driving signal with the hovering electrode or the user electrode as an apex may be Gaussian or inverse Gaussian distribution, but the exemplary embodiment is not limited to such an embodiment.

The touch position processor 204 may measure a change in an amount of charge of the self-sensing capacitor to generate position information, including a floating position, a hovering position, or a touch position.

Figure 2A:
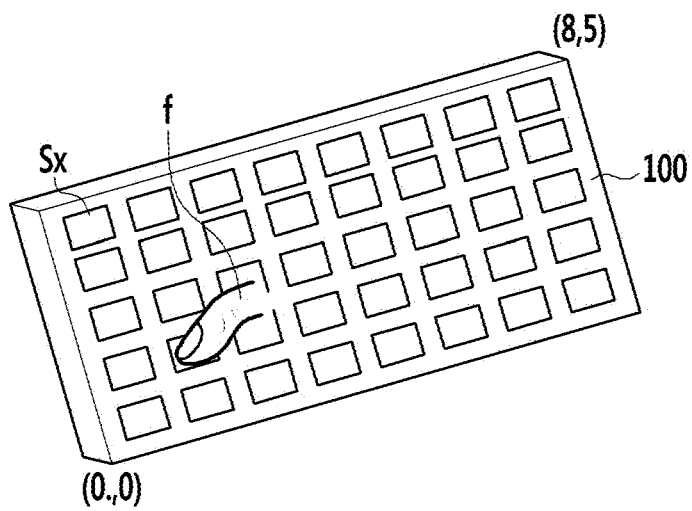
FIG. 2A illustrates a single touch on a touch panel according to an exemplary embodiment.
Figure 2B:
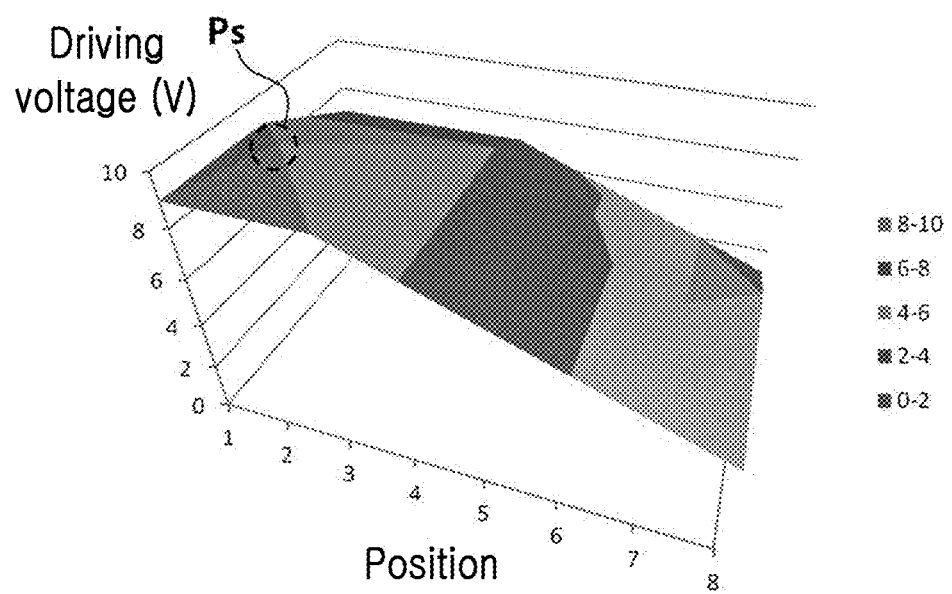
FIG. 2B illustrates distribution of a driving signal for the single touch on the touch panel of FIG. 2A.

FIG. 2A illustrates a single touch on a touch panel according to an exemplary embodiment. FIG. 2B illustrates distribution of a driving signal for the single touch on the touch panel of FIG. 2A. For brevity, the touch panel 100 in FIG. 2A illustrates 40 touch electrodes Sx from coordinate (0,0) to coordinate (8,5). However, the exemplary embodiment is not limited to 40 touch electrodes Sx, but may include more than 40 touch electrodes Sx or less than 40 touch electrodes Sx.

Referring to FIG. 2A, a finger f1 touches the touch electrode Sx at the coordinate (2,2). In response, the controller 2032 determines that the hovering electrode at the coordinate (2,2) has been touched once (i.e., a single touch occurred).

Referring to FIG. 2B, the controller 2032 controls the driving signal level of the touch panel 100 to form a Gaussian distribution with the signal level (e.g., driving signal level) of the hovering electrode at position (2,2) as an apex $P_S$. As shown, the signal of the apex $P_S$ may have 10 volts. However, the exemplary embodiment is not limited to assigning 10 volts to the apex $P_S$ and may instead assign more than 10 volts or less than 10 volts to the apex $P_S$.

Figure 3A:
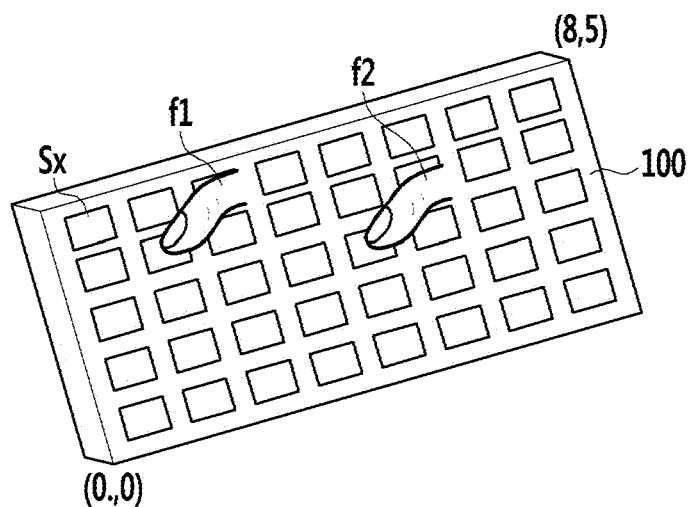
FIG. 3A illustrates multiple touches on a touch panel according to an exemplary embodiment.
Figure 3B:
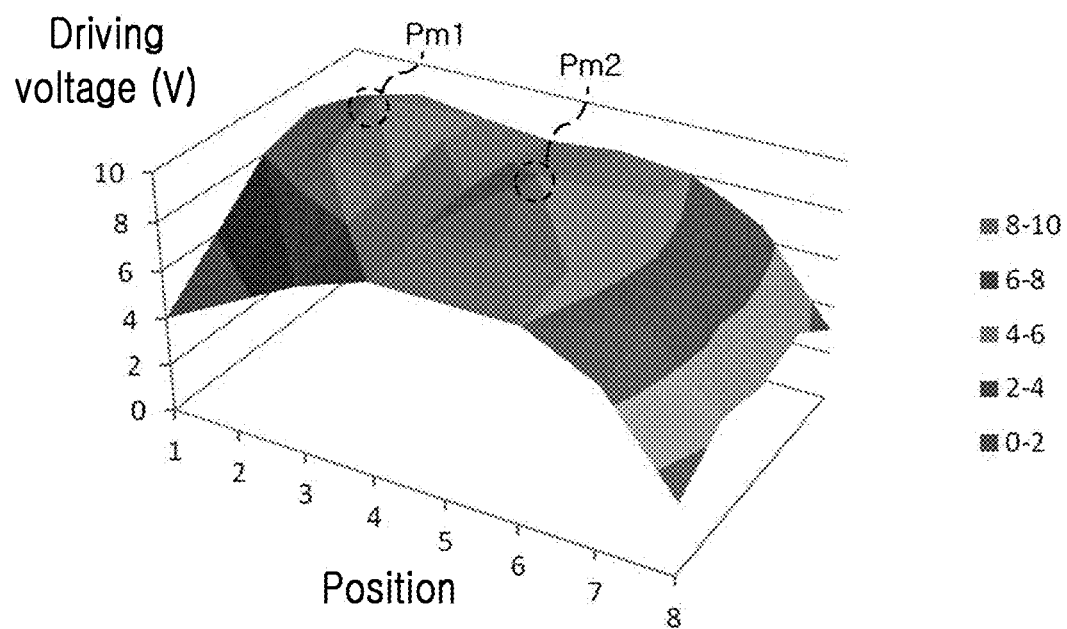
FIG. 3B illustrates distribution of driving signals for the multiple touches on the touch panel of FIG. 3A.

FIG. 3A illustrates multiple touches on a touch panel according to an exemplary embodiment. FIG. 3B shows distribution of driving signals for multiple touches on the touch panel of FIG. 3A. For brevity, the touch panel 100 in FIG. 3A illustrates 40 touch electrodes Sx from coordinate (0,0) to coordinate (8,5). However, the exemplary embodiment is not limited to 40 touch electrodes Sx, but may include more than 40 touch electrodes Sx or less than 40 touch electrodes Sx.

Referring to FIG. 3A, a first finger f1 hovers and touches the touch electrode Sx at the coordinate (2,4) and a second finger f2 hovers and touches the touch electrode Sx at the coordinate (5,3). Accordingly, the controller 2032 determines that the hovering electrodes at the coordinate (2,4) and the coordinate (5,3) have been touched multiple times.

Referring to FIG. 3B, the controller 2032 controls the driving signal level of the touch panel 100 to form a Gaussian distribution with the signal level of the hovering electrode at the coordinate (2,4) as a first apex Pm1 and the signal level of the hovering electrode at the coordinate (5,3) as a second apex Pm2. The voltage level of the first apex Pm1 may correspond to that of the second apex Pm2. Alternatively, the voltage level of the first apex Pm1 may be different from the voltage level of the second apex Pm2.

Figure 4A:
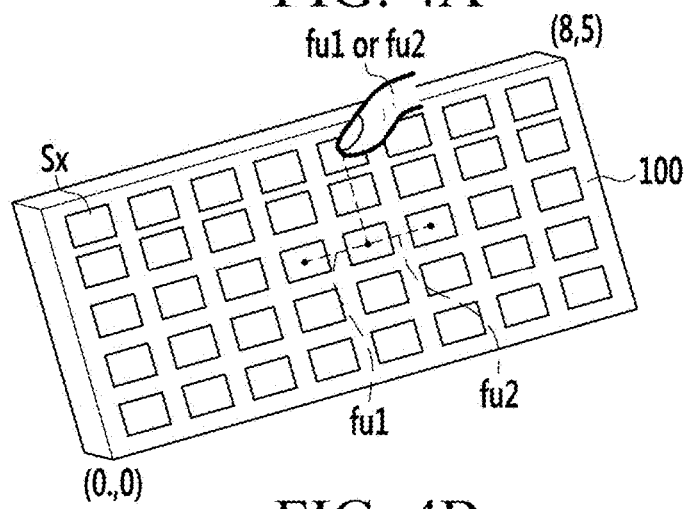
FIG. 4A illustrates a hovering position of a touch panel according to an exemplary embodiment.
Figure 4B:
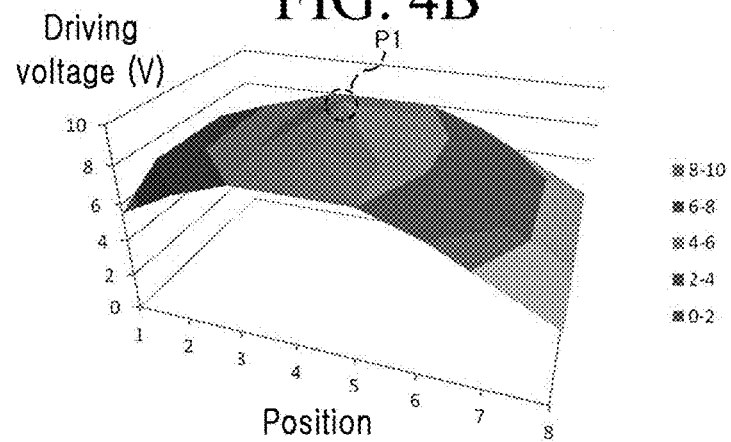
FIG. 4B illustrates a first custom driving signal.
Figure 4C:
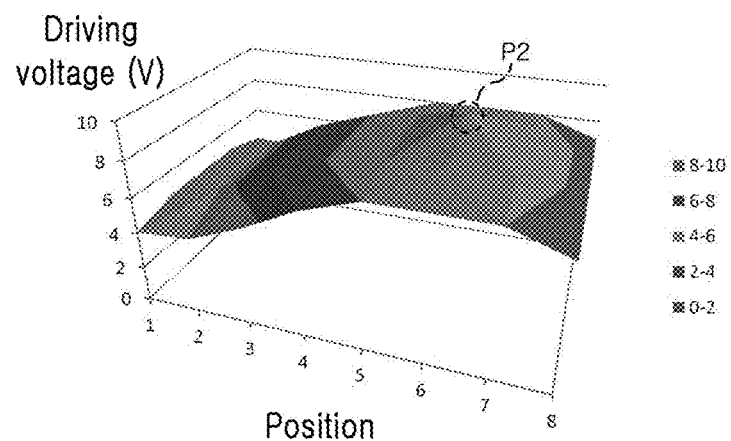
FIG. 4C illustrates a second custom driving signal.

FIG. 4A illustrates a hovering position of a touch panel according to an exemplary embodiment. FIG. 4B illustrates a first custom driving signal. FIG. 4C illustrates a second custom driving signal. For brevity, the touch panel 100 in FIG. 4A illustrates 40 touch electrodes Sx from coordinate (0,0) to coordinate (8,5). However, the exemplary embodiment is not limited to 40 touch electrodes Sx, but may include more than 40 touch electrodes Sx or less than 40 touch electrodes Sx.

Referring to FIG. 4A and FIG. 4B, a first user's finger $f_{U1}$ moves to hover over and contact the hovering electrode Sx at the coordinate (5,3) n times (i.e., a reference number of touching times) and then first user's finger $f_{U1}$ moves and touches the first user touch electrode Sx at the coordinate (4,3).

The controller 2032 identifies the first user's finger $f_{U1}$ based upon first user information. The controller 2032 compares the position of the coordinate (5,3) of the hovering electrode Sx of the first user and the position of the coordinate (4,3) of the first user touch electrode Sx for a reference number of touching times n. The controller 2032 controls generation of a first custom driving signal to form a Gaussian distribution with the coordinate (4,3) as an apex P1 when the first user's finger $f_{U1}$ has a hovering electrode Sx at hovering coordinate (5,3).

Referring to FIG. 4A and FIG. 4C, the second user's finger $f_{U2}$ hovers on and contacts the same touch electrode Sx as the first user's finger $f_{U1}$ at the coordinate (5,3) for a reference number of touching times n. Then, the second user's finger $f_{U2}$ touches the second user touch electrode Sx at the coordinate (6,3), which is different from the first user touch electrode Sx described above.

The controller 2032 identifies the second user's finger $f_{u2}$ based upon second user information. The controller 2032 compares the position of the coordinate (5,3) of the hovering electrode Sx of the second user's finger $f_{U2}$ and the position of the coordinate (6,3) of the second user touch electrode Sx. The controller 2032 controls generation of a second custom driving signal so as to form a Gaussian distribution with the coordinate (6,3) as an apex P2 when the second user's hovering electrode Sx is the coordinate (5,3).

In this way, the controller 2032 may generate different custom driving signals for respective users.

Figure 5:
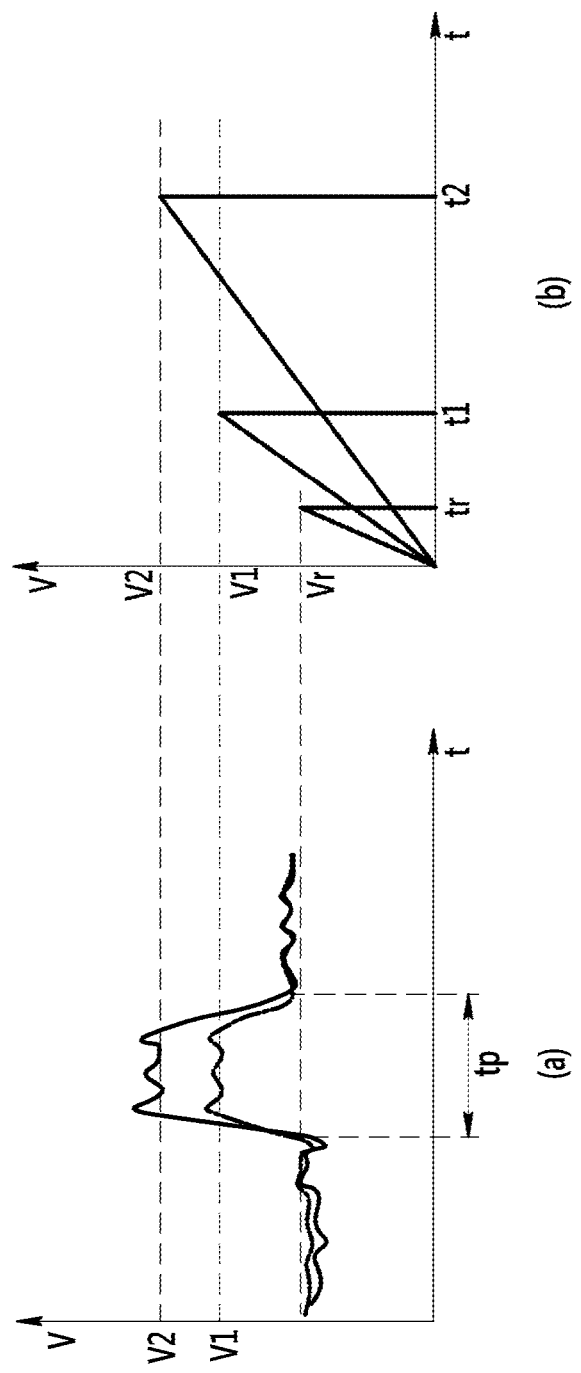
FIG. 5 illustrates two graphs where Graph (a) shows a charged amount according to a user's touch area on a touch panel according to an exemplary embodiment and Graph (b) shows a discharging time of the charged amount of Graph (a).

FIG. 5 illustrates Graph (a) as showing a charged amount according to a user's touch area on a touch panel according to an exemplary embodiment. FIG. 5 also illustrates Graph (b) showing a discharging time of the charged amount of Graph (a). A user recognizing operation by a user recognition analyzer 201 and a user driving signal will now be described with reference to Graphs (a) and (b) of FIG. 5.

In FIG. 5, Graph (a) shows a horizontal axis representing a touching time and a vertical axis indicating an amount of stored charge of a self-sensing capacitor. Referring to Graph (a) and Table 1 below, a user A and a user B touch a touch electrode for a touching time tp. A finger radius of user A is 3 mm, with an area of 28.26 mm². A finger radius of user B is 3.5 mm, with an area of 38.456 mm². Because user A has a smaller finger in radius and area than user B, the amount of stored charge V2 of the self-sensing capacitor of the user A is greater than the amount of stored charge V1 of the self-sensing capacitor of user B.

TABLE 1

| User | Finger Radius (mm) | Area (mm²) | Change in Amount of Charge Ratio (%) | Driving Signal (V) | Reduction Ratio (%) of Driving Signal |
|---|---|---|---|---|---|
| Ref. | 2.5 | 19.625 | 100 | 10.0 | — |
| A | 3 | 28.26 | 144 | 6.9 | 31 |
| B | 3.5 | 38.465 | 196 | 5.1 | 49 |

The user recognition analyzer 201 measures the amount of stored charge V1 of the self-sensing capacitor of the user A to recognize the user A and measures the amount of stored charge V2 of the self-sensing capacitor of the user B to recognize the user B.

Referring to Graph (b) and Table 1, the user recognition analyzer 201 measures a discharging time t1 of the amount of stored charge V1 and a discharging time t2 of the amount of stored charge V2. The user recognition analyzer 201 sets the finger radius 2.5 mm as a reference radius, the area 19.625 mm² as a reference area. The user recognition analyzer 201 sets the discharging time corresponding to the reference radius and the reference area as a reference discharging time tr. The user recognition analyzer 201 compares the reference discharging time tr and one of the discharging time t1 and the discharging time t2. The user recognition analyzer 201 recognizes user A based on the discharging time t1 that is larger than the reference discharging time tr but smaller than discharging time t2 of user B. The user recognition analyzer recognizes user B based on the discharging time t2 that is longer than the reference discharging time tr and the discharging time t1 of user A. Thus, the user recognition analyzer 201 recognizes user B as a different user from user A because the discharging time t2 of user B does not equal the discharging time t1 of user A. Instead, the discharging time t2 of user B is larger than the discharging time t1 of user A by more than a negligible factor. The user recognition analyzer 201 generates user information including the recognized user information and the number of times the touch panel is touched.

Referring to Table 1, the controller 2032 controls generation of the driving signal (Vr, 10 volts) when the user is not recognized. The controller 2032 controls generation of a user A driving signal (6.9 volts) when the user A is recognized, and it controls generation of a user B driving signal (5.1 volts) when the user B is recognized.

The ratio of change of an amount of charge of user A is increased by 144% with respect to the ratio of change of the reference driving signal of 100%. The reduction ratio of the driving signal of user A is 31% with respect to the reference driving signal of 10 volts. Thus, the driving signal of user A is 6.9 volts.

The ratio of change of an amount of charge of user B is increased by 196% with respect to the ratio of change of the reference driving signal of 100%. The driving signal of user B is reduced by 49% with respect to the reference driving signal of 10 volts. Thus, the driving signal of user B is 5.1 volts.

Accordingly, the controller 2032 may control generation of the user driving signal that is inversely proportional to the finger radius and the area.

Figure 6:
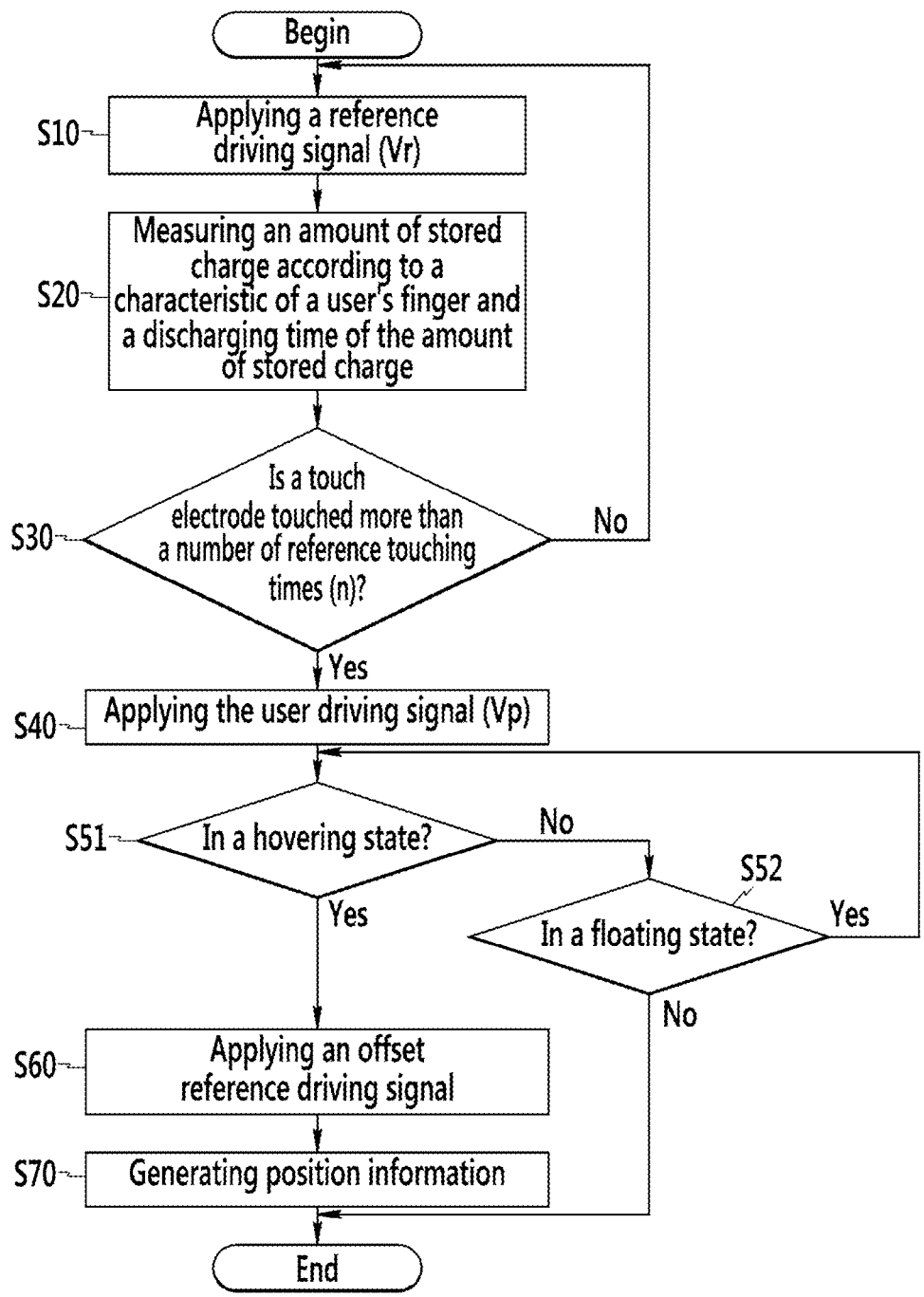
FIG. 6 illustrates a flowchart of a method for driving a touch panel according to an exemplary embodiment.

FIG. 6 shows a flowchart of a method of driving a touch panel according to an exemplary embodiment.

The driving signal supplier 203 applies a reference driving signal Vr of 10 volts to the touch electrode Sx in block S10. The user recognition analyzer 201 measures an amount of stored charge according to a characteristic of the user's finger and a discharging time of the amount of stored charge in block S20. The user recognition analyzer 201 generates user information based upon the measured amount of stored charge and the discharging time of the amount of stored charge.

The driving signal supplier 203 compares a number of touching times and a reference number of touching times 'n' to determine whether a touch electrode is touched more than a number of reference touching times 'n' in determination block S30. If, the touch panel 100 was touched less than or equal the reference number of touches 'n', then the driving signal supplier 203 determines that a touch electrode is not touched more than a number of reference touching times (i.e., determination block S30="No") and continues to apply the reference driving signal Vr of 10 volts to the touch electrode Sx in block S10.

However, if the touch panel 100 was touched more than the reference number of touches 'n', then the driving signal supplier 203 determines that a touch electrode is touched more than a number of reference number of touching times (i.e., determination block S30="Yes") and applies the user driving signal Vp in S40 and moves to determination block S51.

After the driving signal supplier 203 applies the user driving signal Vp the hovering analyzer 202 determines whether the touch panel 100 is in a hovering state. More specifically, the hovering analyzer 202 determines whether a touch electrode Sx was touched based on generated hovering information. The hovering analyzer 202 generates hovering information based on measuring a time change in the amount of charge of the self-sensing capacitor. If an electrode Sx is not touched, the hovering analyzer 202 determines that the touch panel 100 is not in a hovering state (i.e., determination block S51="No") and moves to determination block S52.

The hovering analyzer 202 determines whether the touch electrode is in a floating state in determination block S52. If an touch electrode Sx does not detect an object (i.e., a user's finger) is moving parallel, approaching, or held at a near but constant distance from the touch electrode Sx based on hovering and/or floating information or a lack of hovering and/or floating information (i.e., information based on a time change in the amount of charge of the self-sensing capacitor), then the hovering analyzer 202 determines that the touch panel 100 is not in a floating state (i.e., determination block S52="No") terminating the driving method of FIG. 6.

However, if an touch electrode Sx detects an object (i.e., a user's finger) is moving parallel, approaching, or held at a near but constant distance from the electrode Sx based on hovering and/or floating information, then the hovering analyzer 202 determines that the object is floating state (i.e., determination block S52="Yes") and returns to determination block S51. In determination block S51, the hovering analyzer continues to measure a time change in the amount of charge of the self-sensing capacitor to generate hovering information for determining whether the touch panel 100 is in a hovering state or not.

In determination block S51, if the touch electrode Sx is eventually touched, the hovering analyzer 202 may determine that the touch panel 100 is in a hovering state (i.e., determination block S51=Yes) and moves to block S60.

Because the touch panel 100 is in a hovering state, the driving signal supplier 203 applies an offset to the reference driving signal (Vr, 10 volts) by 2.5 volts to apply the offset reference driving signal (7.5 volts) to the touch electrode Sx in S60.

The touch position processor 204 generates position information based on the touched electrode Sx in S70.

Figure 7:
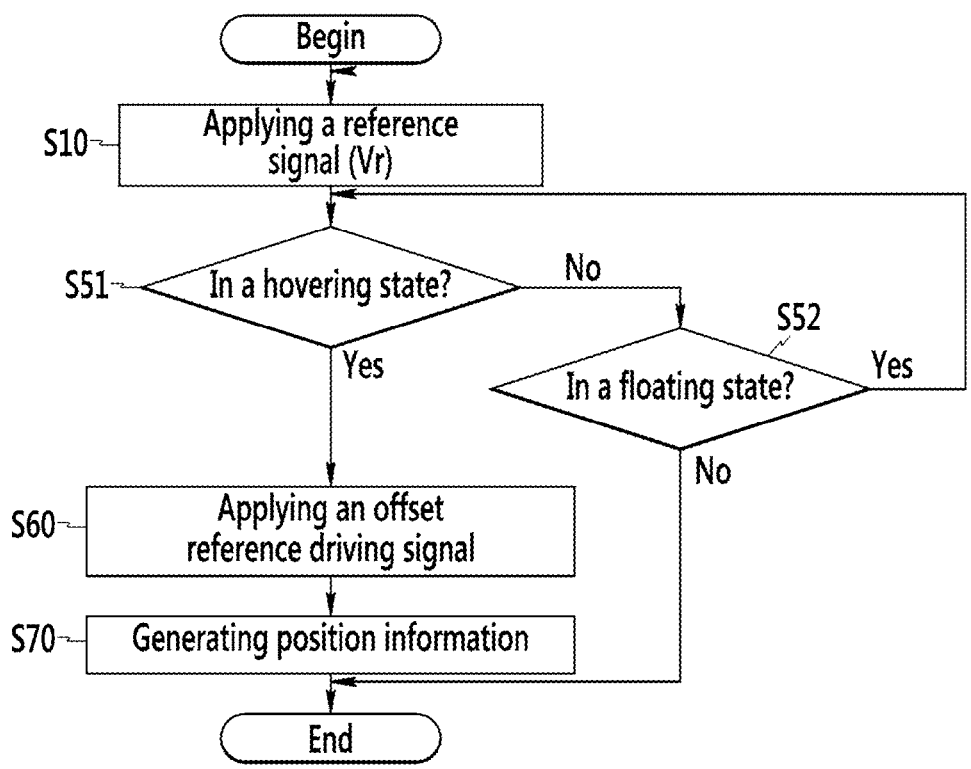
FIG. 7 illustrates a flow chart of a similar method for driving a touch panel according to the exemplary embodiment of FIG. 6.

FIG. 7 illustrates a flow chart of a similar method for driving a touch panel according to the exemplary embodiment of FIG. 6. For brevity, only the differences between FIGS. 6 and 7 will be discussed.

FIG. 7 is identical to FIG. 6 except that the method of FIG. 7 does not include blocks S20, S30, and S40. The method of FIG. 7 does not measure the apply a user driving signal Vp. Thus, in determination block S52, if an touch electrode Sx detects an object (i.e., a user's finger) is moving parallel, approaching, or held at a near but constant distance from the electrode Sx based on hovering and/or floating information, then the hovering analyzer 202 determines that the object is floating state (i.e., determination block S52="Yes"), continues to apply the reference driving signal Vr and returns to determination block S51.

Further, the touch panel and the method for driving a touch panel according to the exemplary embodiment of the present invention change the touch driving signal according to the user to reduce power consumption.

Although certain exemplary embodiments and implementations have been described herein, other embodiments and modifications will be apparent from this description.

Accordingly, the inventive concept is not limited to such embodiments, but rather to the broader scope of the presented claims and various obvious modifications and equivalent arrangements.

What is claimed is:

1. A touch panel, comprising:
   touch electrodes; and
   a touch driver configured to apply a driving signal to the touch electrodes to form sensing capacitors comprising the touch electrodes, the touch driver configured to sense a change in an amount of charge caused by the sensing capacitors,
   wherein the touch driver is configured to distinguish hovering and floating based upon a result of sensing a time change and an amount of charge, and the touch driver is configured to apply a highest level of the driving signal to a hovering electrode corresponding to a hovering position from among the touch electrodes, and
   wherein the touch driver is configured to apply the driving signal so that distribution of the driving signal of the touch panel corresponds to a Gaussian distribution with a driving signal of the hovering electrode as an apex.

2. The touch panel of claim 1, wherein:
   the touch driver is configured to recognize a first user by sensing the change of an amount of charge of a first capacitor formed by the first user, and recognizes a second user by sensing the change of the amount of charge of a second capacitor formed by the second user.

3. The touch panel of claim 2, wherein:
   the touch driver is configured to recognize the first user based upon a discharging time of the first capacitor and recognize the second user based upon a discharging time of the second capacitor.

4. The touch panel of claim 3, wherein:
   the touch driver is configured to generate at least one of a first user driving signal and a second user driving signal, and the at least one of the first user driving signal and the second user driving signal is inversely proportional to an area of an object.

5. The touch panel of claim 4, wherein:
   the touch driver is configured to count a number of times a touch electrode is touched and apply a reference driving signal to the touch electrode when a counted number of touching times is less than or equal to a reference number of touching times 'n', and the touch driver is configured to apply at least one of the first user driving signal and the second user driving signal to the touch electrode when the counted number of touching times is greater than the reference number of touching times 'n'.

6. The touch panel of claim 5, wherein:
   the touch driver compares the position of the hovering electrode of the first user and a position of a first user touch electrode,
   the touch driver is configured to apply the first user driving signal so that the distribution of the first user driving signal of the touch panel comprises a Gaussian distribution with the driving signal of the first user electrode as an apex when the hovering electrode of the first user is different from the first user touch electrode,
   the touch driver compares the position of the hovering electrode of the second user and the position of a second user touch electrode,
   the touch driver is configured to apply the second user driving signal so that the distribution of the second user driving signal of the touch panel comprises a Gaussian distribution with the driving signal of the second user electrode as the apex when the hovering electrode of the second user is different from the second user touch electrode, and
   the position of the hovering electrode of the first user corresponds to the position of the hovering electrode of the second user, and the position of the first user touch electrode is different from the position of the second user touch electrode.

7. The touch panel of claim 6, wherein:
   the touch driver is configured to apply the first user driving signal so that the distribution of the first user driving signal of the touch panel comprises a Gaussian distribution with the driving signal of the first user touch electrode as the apex when the first user touches the first user touch electrode greater than the reference number of touching times 'n'.

8. The touch panel of claim 1, wherein:
   the touch driver is configured to apply a reference driving signal when floating is sensed,
   apply an offset driving signal when hovering is sensed, and a level of the offset driving signal is lower than the reference driving signal.

9. A method for driving a touch panel comprising a touch driver configured to perform the method steps, comprising:
   distinguishing hovering of an object as the object approaches a touch electrode of touch electrodes of the touch panel and touches the touch electrode from floating of the object as the object approaches the touch electrode but does not touch the touch electrode; and
   applying a highest level of a driving signal to at least one of a hovering electrode that is the touch electrode corresponding to a hovering position of the object and a touch electrode corresponding to the object touching the touch electrode greater than a reference number of touching times 'n'; and
   wherein applying the highest level of the driving signal comprises:
   applying the driving signal so that distribution of the driving signal of the touch panel comprises a Gaussian distribution with the driving signal of the hovering electrode as an apex.

10. The method of claim 9, further comprising:
    recognizing at least one of a first user by sensing a change in the amount of charge of a first capacitor formed by the first user and a second user by sensing the change in an amount of charge of a second capacitor formed by the second user.

11. The method of claim 10, further comprising:
    recognizing the first user and the second user, wherein:
    the recognition of the first user comprises recognizing the first user based upon a discharging time of the first capacitor, and
    the recognition of the second user comprises recognizing the second user based upon a discharging time of the second capacitor.

12. The method of claim 11, further comprising:
    generating a first user driving signal that is inversely proportional to a first area of a first user's finger; and
    generating a second user driving signal that is inversely proportional to a second area of second user's finger.

13. The method of claim 12, further comprising:
    counting a number of times the touch electrode is touched;

applying a reference driving signal to the touch electrode when the counted number of touching times is less than or equal to a reference number of touching times 'n'; and applying at least one of the first user driving signal and the second user driving signal to the touch electrode when the counted number of touching times is greater than the reference number of touching times 'n'.

14. The method of claim 13, further comprising:

comparing the position of the hovering electrode of the first user and the position of a first user touch electrode touched by the first user;

applying the first user driving signal so that distribution of the driving signal of the touch panel comprises a Gaussian distribution with the driving signal of the first user touch electrode as the apex when the hovering electrode of the first user is different from the first user touch electrode;

comparing the position of the hovering electrode of the second user and the position of a second user touch electrode; and applying the second user driving signal so that distribution of the driving signal of the touch panel comprises a Gaussian distribution with the driving signal of the second user touch electrode as the apex when the hovering electrode of the second user is different from the second user touch electrode, wherein the position of the hovering electrode of the first user corresponds to the position of the hovering electrode of the second user, and the position of the first user touch electrode is different from the position of the second user touch electrode.

15. The method of claim 9, further comprising:

applying the driving signal so that a distribution of the driving signal of the touch panel comprises a Gaussian distribution with the driving signal of a first user touch electrode as an apex when touching of the first user is greater than the reference number of touching times 'n'.

16. The method of claim 9, wherein applying the highest level of driving signal comprises:

applying a reference driving signal when floating is sensed; and applying an offset driving signal when hovering is sensed, and a level of the offset driving signal is lower than that of the reference driving signal.

\* \* \* \* \*